July 17, 1962

R. E. MEYER ET AL 3,044,479

CONTAMINATE FREE CONDUIT MEANS AND METHOD
OF ASSEMBLY THEREOF
Filed Feb. 26, 1960

INVENTORS
ROBERT E. MEYER
SEYMOUR BELLAK

BY *Vernon F Hauschild*
ATTORNEY

United States Patent Office 3,044,479
Patented July 17, 1962

3,044,479
CONTAMINATE FREE CONDUIT MEANS AND METHOD OF ASSEMBLY THEREOF
Robert E. Meyer, Jupiter, and Seymour Bellak, North Palm Beach, Fla., assignors to United Aircraft Corporation, East Hartford, Conn., a corporation of Delaware
Filed Feb. 26, 1960, Ser. No. 11,325
6 Claims. (Cl. 137—68)

This invention relates to the conveying or pumping of an easily contaminated fluid such as liquid oxygen and more particularly to the immaculate protection of the fluid conveying parts during storage, handling and final assembly.

It is an object of this invention to teach the use of frangible gaskets to be sealably placed across the inlet and outlet of the conveying apparatus of the contaminable fluid, such as liquid oxygen, during all handling operations and final assembly. The fragility of the gasket is to be such that the normal flow pressure head of the liquid oxygen will be sufficient to rupture the frangible gaskets and permit flow through the conveying parts in their joined condition.

It is a further object of this invention to teach the use of sealing frangible gaskets across both inlet and outlet of liquid oxygen conveying parts, which gaskets are made of a material such as 100x Teflon, Mylar, Kel F, very thin metal, such as aluminum or steel, which is compatible with liquid oxygen or the fluid being conveyed.

Other objects and advantages will be apparent from the specification and claims, and from the accompanying drawings which illustrate an embodiment of the invention.

In the use of easily contaminated liquid oxygen, it is essential that all foreign matter such as metal chips, dirt and so forth be kept out of contact with the liquid oxygen for contact therebetween causes fire or explosion.

The purpose of this invention is to teach apparatus whereby liquid oxygen conveying parts may be stored, handled and finally assembled into a liquid oxygen conveying apparatus without fear of contamination thereof by undesirable foreign matter such as metal chips and dirt. Further, this invention teaches the use of a thin, frangible gasket sealably retained across the face of the inlet and outlet of liquid oxygen conveying parts during storage, handling and final assembly, which frangible gaskets are sufficiently weak as to be easily rupturable by the normal flow pressure head of liquid oxygen to be pumped therethrough and which are made of a material which is compatible with liquid oxygen.

Figure 1:
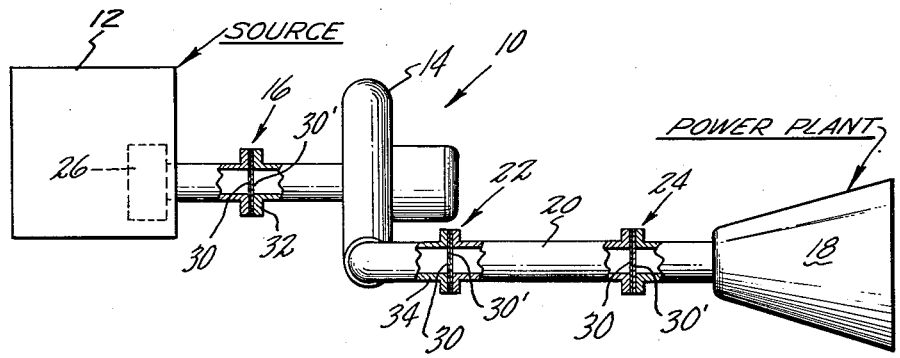
FIG. 1 is a schematic representation of a liquid conveying apparatus including a source, pumping unit and the power plant to be provided with the liquid.

Referring to FIG. 1 we see liquid oxygen conveying apparatus 10 including a source 12 sealably joined to liquid oxygen pump 14 by connecting means 16. Pump 14 is sealably connected to power plant 18 through conveying conduit 20 which is joined to pump 14 and power plant 18 by connecting means 22 and 24, respectively. Power plant 18 may be of the type taught in U.S. application Serial Nos. 650,913 and 813,804 filed April 5, 1957, and May 18, 1959, respectively, and 693,178 filed October 27, 1957, or of the type taught in Time magazine, page 37 of the December 21, 1959, issue. Liquid oxygen from source 12, which may include pump 26 if gravity is insufficient, is pumped therethrough and through pump 14 to power plane 18 with sufficient pressure to rupture frangible gaskets 30 which sealably extend across the inlet and outlet, such as inlet 32 and outlet 34 of pump 14, and are caused to adhere thereto in any convenient fashion such as the use of a compatible adhesive, mechanical or heat bonding.

Frangible gaskets 30 are made of material which is compatible with liquid oxygen and which will be easily ruptured by the normal flow pressure head through the liquid oxygen conveying system 10.

Synthetic materials such as 100x Teflon, Mylar, Kel F or very thin metal such as aluminum or steel are suggested for gasket material.

Figure 2:
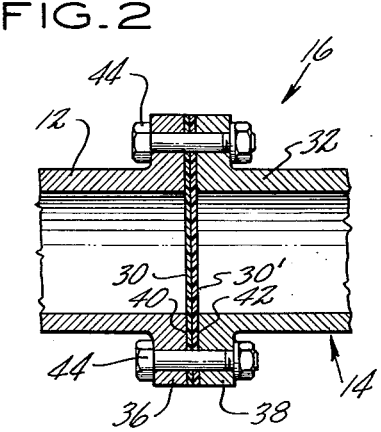
FIG. 2 is an enlarged fragmentary showing of contaminable liquid conveying parts sealably joined with frangible gaskets therebetween and joined by the conventional nut and bolt process.

Referring to FIG. 2 we see an illustration of connecting means 16 joining source 12 with pump inlet 32 and which is made in the form of circumferentially extending flanges 36 and 38 having faces 40 and 42 against which frangible gaskets 30 and 30' are sealably engaged so as to prevent the entry of foreign material into either source 12 or pump inlet 32. By the use of nut and bolt units 44, frangible gaskets 30 and 30' are sealably clamped between flanges 36 and 38 so that when the normal pressure of liquid oxygen passing from supply 12 into pump inlet 32 ruptures the central portion of frangible gaskets 30 and 30', the outer peripheral portions thereof which are pinched between flanges 36 and 38 coact therewith to form a sealed connection between elements 12 and 32.

Figure 3:
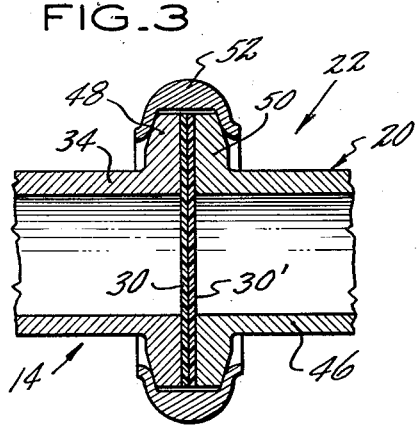
FIG. 3 is like FIG. 2 but the fluid conveying parts are joined by clamp means.

Referring to FIG. 3 we see a connecting means 22 connecting the outlet 34 of pump 14 with the inlet 46 of conduit 20. Circumferential flanges 48 and 50 of outlet 34 and inlet 46 with frangible gaskets 30 and 30' extending thereacross and in sealing engagement therewith so as to prevent the entry of foreign matter into either element 14 or element 20. Clamp 52, which may be of the half circle type joined by bolts, pinches the outer periphery of flanges 48 and 50 together and pinches the outer periphery of frangible gaskets 30 and 30' therebetween to form a sealed connection between members 14 and 20 both before and after the liquid oxygen ruptures frangible gaskets 30 and 30'.

Figure 4:
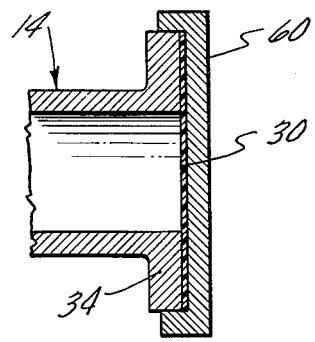
FIG. 4 is a cross-sectional showing of a conveying part with a permanent frangible gasket and a protective cap.

As best shown in FIG. 4, it may be desirable during periods of storage and handling to have a protective cap 60 over the inlet and outlet of the liquid oxygen conveying parts to protect the frangible gasket 30 but such would be removed just prior to final assembly.

It is to be understod that the invention is not limited to the specific embodiment herein illustrated and described but may be used in other ways without departure from its spirit as defined by the following claims.

We claim:

1. The method of producing a multi-segment, uncontaminated fluid conduit comprising sealably placing a contaminate free frangible gasket over the entirety of both inlet and outlet flanges of individual conduit segments before they are exposed to contaminate, then connecting the conduit segments before they are exposed to contaminate to compress the frangible gaskets between the inlet and outlet end flanges of adjacent conduit segments.

2. The method of producing a multi-segment, uncontaminated fluid conduit comprising sealably placing a contaminate free frangible gasket over the entirety of both inlet and outlet flanges of individual conduit segments before they are exposed to contaminate, then connecting the conduit segments before they are exposed to contaminate to compress two frangible gaskets between the inlet and outlet end flanges of adjacent conduit segments.

3. The method of producing a multi-segment, uncontaminated fluid conduit comprising sealably placing a contaminate free frangible gasket over the entirety of both inlet and outlet flanges of individual conduit segments before they are exposed to contaminate, then connecting the conduit segments before they are exposed to contaminate to compress two frangible gaskets between the inlet and outlet end flanges of adjacent conduit segments, and then passing fluid through the segments to rupture the frangible gaskets.

4. Contaminate free apparatus for conveying liquid including at least two contaminate free liquid conveying parts each having an inlet and an outlet end flange around inlet and outlet apertures, contaminate free frangible gaskets extending across both said inlet and said outlet apertures and sealably engaging said end flanges of said parts thereby completely sealing said inlet and outlet apertures of said parts, and means to join said parts end to end in sealed relation while contaminate free so that two of said frangible gaskets are compressed between said inlet and said outlet end flanges of adjacent parts.

5. Contaminate free apparatus for conveying liquid including at least two contaminate free liquid conveying parts each having an inlet and an outlet end flange around inlet and outlet apertures, contaminate free frangible gaskets extending across both said inlet and said outlet apertures and sealably engaging said end flanges of said parts thereby completely sealing said inlet and outlet apertures of said parts, and means to join said parts end to end in sealed relation while contaminate free so that two of said frangible gaskets are compressed between said inlet and said outlet end flanges of adjacent parts, means to pass fluid through said inlet and outlet of said parts with sufficient force to rupture said frangible gaskets, said gaskets being made of a material which is compatible with the fluid passed.

6. Contaminate free apparatus for conveying liquid oxygen including a plurality of contaminate free liquid conveying parts each having an inlet and an outlet end flange around inlet and outlet apertures, contaminate free easily frangible gaskets across both said inlet and said outlet apertures and sealably engaging said end flanges of said parts thereby completely sealing said inlet and outlet apertures of said contaminate free parts, means to join said parts end to end in sealed relation while contaminate free so that two of said frangible gaskets are compressed between said inlet and said outlet end flanges of adjacent parts, pump means to pass fluid through said parts with sufficient force to rupture said frangible gaskets, said gaskets being made of a material which is compatible with the liquid oxygen pumped.

References Cited in the file of this patent

UNITED STATES PATENTS

| | | |
|---|---|---|
| 1,774,165 | Black | Aug. 26, 1930 |
| 2,028,576 | Dyke | Jan. 21, 1936 |
| 2,118,073 | Dittmeyer | May 24, 1938 |
| 2,169,123 | Galosha | Aug. 8, 1939 |
| 2,895,492 | Bell | July 21, 1959 |
| 2,933,333 | Dredtschneider | Apr. 19, 1960 |
| 2,958,545 | Stelzer | Nov. 1, 1960 |
| 2,962,038 | Bird | Nov. 29, 1960 |

FOREIGN PATENTS

| | | |
|---|---|---|
| 3,199 | Great Britain | Sept. 13, 1875 |